(12) United States Patent
Voss

(10) Patent No.: US 8,366,196 B2
(45) Date of Patent: Feb. 5, 2013

(54) HINGED FITTING

(76) Inventor: Hans Werner Voss, Rockenhausen (DE)

(*) Notice: Subject to any disclaimer, the term of this patent is extended or adjusted under 35 U.S.C. 154(b) by 519 days.

(21) Appl. No.: 12/448,829

(22) PCT Filed: May 2, 2007

(86) PCT No.: PCT/DE2007/000776
§ 371 (c)(1),
(2), (4) Date: Nov. 23, 2009

(87) PCT Pub. No.: WO2008/083642
PCT Pub. Date: Jul. 17, 2008

(65) Prior Publication Data
US 2010/0071164 A1 Mar. 25, 2010

(30) Foreign Application Priority Data
Jan. 9, 2007 (EP) .................................... 07000308

(51) Int. Cl.
*B60N 2/00* (2006.01)
(52) U.S. Cl. .................................. 297/362.12; 297/362
(58) Field of Classification Search .................. 297/362, 297/362.12
See application file for complete search history.

(56) References Cited

U.S. PATENT DOCUMENTS

| 4,054,966 | A | * | 10/1977 | Putsch et al. ..................... 16/324 |
| 4,326,748 | A | * | 4/1982 | Brusasco ....................... 297/362 |
| 2003/0080599 | A1 | * | 5/2003 | Hohn et al. .................... 297/362 |
| 2006/0279121 | A1 | * | 12/2006 | Matsumoto et al. .......... 297/362 |

FOREIGN PATENT DOCUMENTS

| DE | 25 09 074 A1 | 9/1976 |
| DE | 38 11 074 A1 | 10/1989 |
| DE | 44 37 073 A1 | 1/1996 |
| FR | 2 424 854 A | 11/1979 |
| GB | 1 462 850 | 1/1977 |

* cited by examiner

*Primary Examiner* — Sarah B McPartlin
(74) *Attorney, Agent, or Firm* — Muncy, Geissler, Olds & Lowe, PLLC

(57) ABSTRACT

The invention relates to a hinged fitting for vehicle seats, having a fixed fitting part and a pivotable fitting part which are pivotably connected to each other about a swivel axis (2). The swivel movement of the pivotable component can be blocked in a stepless manner by a blocking device. A first blocking element (4) is connected in a nonrotatable manner to the fixed fitting part, and a second blocking element (5) is connected in a nonrotatable manner to the pivotable fitting part. Thereby the blocking elements which are positioned opposite each other coaxially to the swivel axis (2) can be coupled and decoupled to and from each other in a nonrotatable manner by means of an actuating unit.

12 Claims, 2 Drawing Sheets

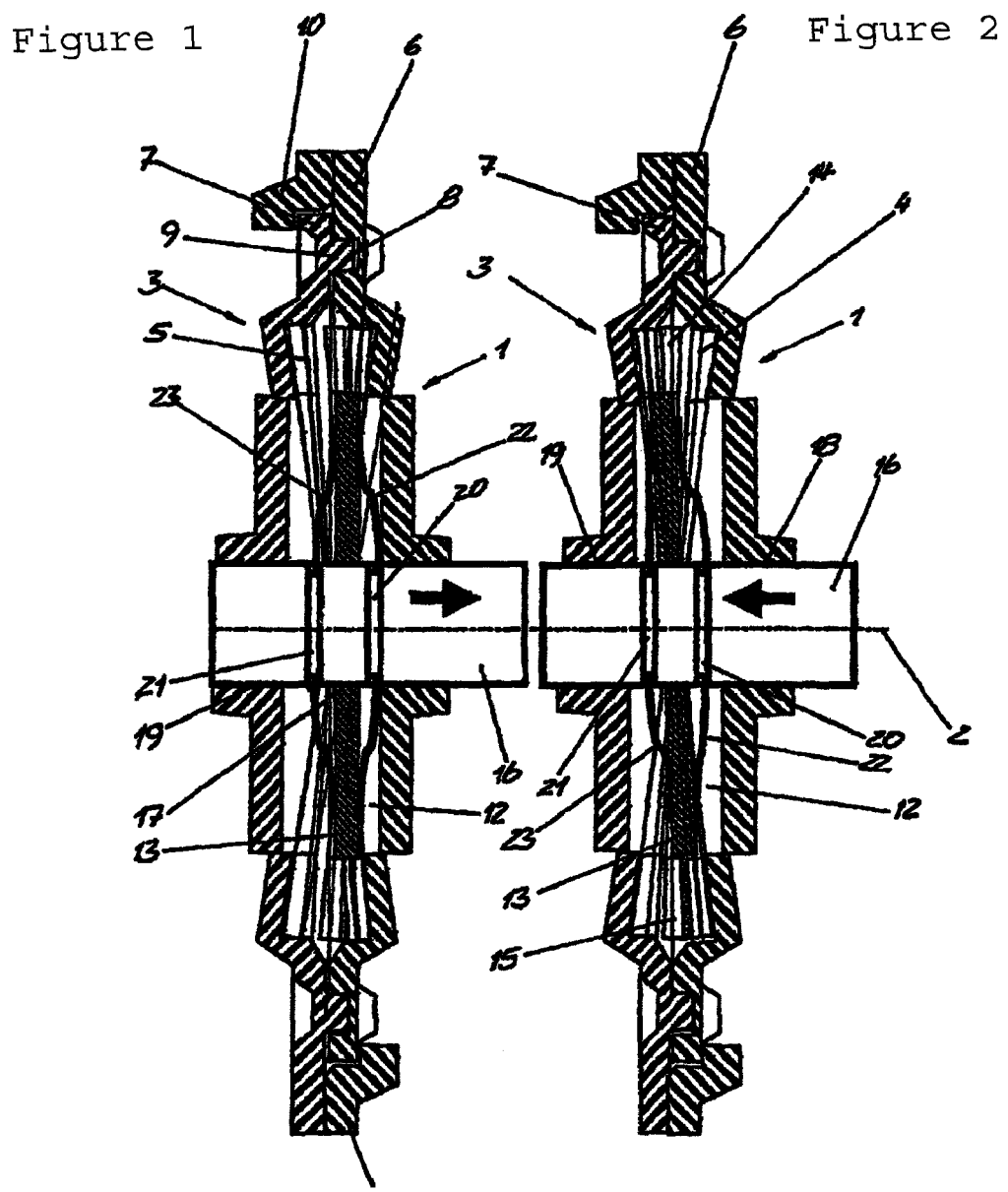

HINGED FITTING

This nonprovisional application is a National Stage of International Application No. PCT/DE2007/000776, which was filed on May 2, 2007.

BACKGROUND OF THE INVENTION

1. Field of the Invention.

The invention relates to a hinged fitting for a vehicle seat, with a fixed fitting part and a pivotable fitting part which are connected to each other in a manner such that they can pivot about a pivot axis, wherein the pivoting movement of the pivotable fitting part can be infinitely variably blocked by a blocking device, with a first blocking element which is connected in a rotationally fixed manner to the fixed fitting part, and a second blocking element which is connected in a rotationally fixed manner to the pivotable fitting part, wherein the blocking elements which lie opposite each other coaxially with respect to the pivot axis can be coupled to each other in a rotationally fixed manner and can be decoupled from each other by means of an actuating device.

2. Description of the Background Art

In the case of a hinged fitting of this type, it is known to fixedly arrange an external taper on the pivotable fitting part coaxially with respect to the pivot axis, onto which external taper an internal taper can be pushed axially by a spring force, said internal taper being connected to the fixed fitting part in an axially displaceable, but rotationally fixed manner.

The two fitting parts are fixed in their position with respect to each other by the frictional connection between the external taper and internal taper.

By means of the actuating device, the internal taper can be raised from the external taper counter to the spring force, and the pivotable fitting part can be pivoted into another pivoting position with respect to the fitting part, in which position the internal taper is then placed onto the external taper again and blocks the pivotable fitting part in the new position.

An infinitely variable adjustment is therefore possible. However, in the event of very high forces acting on the pivotable fitting part, as may occur during sharp decelerations of the vehicle, the frictional connection between the external taper and internal taper is overcome and therefore the pivotable component is inadvertently adjusted.

DE 44 37 073 A1 discloses a hinged fitting for a vehicle seat, with a fixed fitting part and a pivotable fitting part which are connected to each other in a manner such that they can pivot about a pivot axis, wherein the pivoting movement of the pivotable fitting part is infinitely variable.

DE 25 09 074 A1 discloses a hinged fitting in which the two toothed rims, which are directed axially in the same direction, of the two fitting parts are arranged concentrically with respect to each other, wherein a wobble plate which can be driven rotatably by means of a hand wheel engages in the teeth thereof with its toothed rim facing the toothed rims of the fitting parts, in such a manner that, in a partial region of the circumference thereof, the two toothed rims of the fitting parts are coupled to each other by means of wobble plate teeth which simultaneously engage in both toothed rims of the fitting parts. By means of rotation of the hand wheel, the wobble plate is driven rotatably in a wobbling manner and rotates the toothed rims of the fitting parts, which toothed rims have different numbers of teeth, relative to each other.

GB 1 462 850 discloses a device for changing the rotational speed or direction of rotation. This device has an input shaft and an output shaft arranged coaxially with respect to each other, wherein a wobble wheel with an axially directed toothed rim is arranged on the output shaft, said toothed rim engaging by means of a partial region of its circumference in a partial region of a further, axially directed toothed rim arranged fixedly on the input shaft.

SUMMARY OF THE INVENTION

It is therefore the object of the invention to provide a hinged fitting of the type mentioned at the beginning which retains its infinitely variably adjusted position even under high loading while having a simple design which requires little construction space.

This object is achieved according to the invention in that the fixed fitting part has a first gear wheel which is coaxial with respect to the pivot axis and has an axially oriented first toothing, and the pivotable fitting part has a second gear wheel which is coaxial with respect to the pivot axis and has an axially oriented second toothing, said toothings being arranged at a fixed distance from each other coaxially with respect to the pivot axis, a locking wheel being arranged at said distance coaxially between the first and second toothings, said locking wheel having, on both sides, a respective radially encircling, radially oriented toothing with a mutually offset pitch, the geometries of which are designed in such a manner that said toothings can enter the respectively coaxially opposite toothings of the fixed fitting part and movable fitting part, the first toothing of the fixed fitting part having the same number of teeth as the coaxially opposite toothing of the locking wheel, and the second toothing of the movable fitting part having a different number of teeth from the coaxially opposite toothing of the locking wheel, and the locking wheel which can be inclined with respect to the pivot axis being movable axially between the two gear wheels by the actuating device.

A hinged fitting of this type can be used for seats with an adjustable backrest, for example in motor vehicles, but also in aircraft.

The height, inclination and lumbar settings can also be adjusted on seats of this type.

The angle of the teeth of the toothings is preferably somewhat greater than the angle of coefficient of friction of the combination of materials used for the gear wheels. Since said angle is around approximately 6° to 7°, it is advantageous if the angle of the teeth is around approximately 9°. This leads to the axial forces which act on the gear wheel in the event of load lying within a moderate range of magnitude.

In order to adjust the hinged fitting, the locking wheel is moved by the actuating device axially toward the first gear wheel where its toothing completely enters the toothing of the first gear wheel.

The locking wheel is therefore completely disengaged from the second gear wheel such that the pivotable fitting part can be freely pivoted.

If the locking wheel is then moved by the actuating device axially toward the second gear wheel, the tooth difference between the toothing of the second gear wheel and the opposite toothing of the locking wheel results in the tooth tips of said two toothings lying on one another in a partial region while, in the region lying diametrically opposite said partial region, the toothings of the first gear wheel and locking wheel intermesh. This results in a tilting of the locking wheel relative to the pivot axis and in the toothing of the locking wheel entering the toothing of the first gear wheel by a locking wheel region lying diametrically opposite the region which enters the second gear wheel.

The first and second gear wheels are therefore connected to each other in an interlocking manner via the locking wheel, and the second gear wheel and, together therewith, the movable fitting part, are locked in place.

The toothings on both sides of the locking wheel preferably have the same number of teeth and are offset with respect to each other by half a pitch.

The toothings of the locking wheel engage readily with the toothings of the first and second gear wheels if the second toothing of the movable fitting part has a tooth difference of "1" or of ">1" to the coaxially opposite toothing of the locking wheel.

The locking wheel can be mounted by means of a coaxial bore in a freely rotatable and tiltable manner on a hub which is coaxial with respect to the pivot axis and which, for its mounting, can be guided through bearing bores of the first gear wheel and/or of the second gear wheel, which bearing bores are coaxial with respect to the pivot axis. For the axial movement of the locking wheel into its two positions, the hub can simply be mounted in a manner such that it can be displaced axially in the bearing bores between a coupling position and a decoupling position by means of the actuating device, and the locking wheel is held on both sides between spring elements which are arranged on the hub and subject the locking wheel axially to the action of a force.

For this purpose, the spring elements are preferably disk springs which are arranged by means of their bores in annular grooves formed in a radially encircling manner on the hub and are in contact by means of their outer, radially encircling region under prestress with the side surfaces of the locking wheel.

In order to secure the locking wheel in the coupling position or decoupling position taken up in each case, the hub can be lockable in the coupling position and/or in the decoupling position, for example by means of a latching device.

A particularly good engagement, which can be subjected to a high load, of the toothings in each other is achieved in that the toothings of the first gear wheel and/or of the second gear wheel are of inclined design in a manner corresponding to the inclined deflection of the locking wheel with respect to the pivot axis.

The region of the locking wheel and the toothings of the two gear wheels are protectively enclosed in a simple manner without additional components by the first gear wheel and the second gear wheel being in contact with each other by means of their mutually facing, axially directed annular regions located radially outside the locking wheel.

In order to guide the two gear wheels which are rotatable relative to each other, the axially directed annular region of the one gear wheel can have a concentrically encircling groove which is open toward the other gear wheel and in which one or more axially protruding lugs which are of corresponding radial width and are part of the other gear wheel engage.

The first gear wheel is preferably secured by a securing element against lifting off axially from the second gear wheel.

BRIEF DESCRIPTION OF THE DRAWINGS

An exemplary embodiment of the invention is illustrated in the drawing and is described in more detail below. In the drawing:

FIG. 1 shows a cross section of a hinged fitting in the decoupling position,

FIG. 2 shows the hinged fitting according to FIG. 1 in the coupling position,

DETAILED DESCRIPTION

Figure 3:
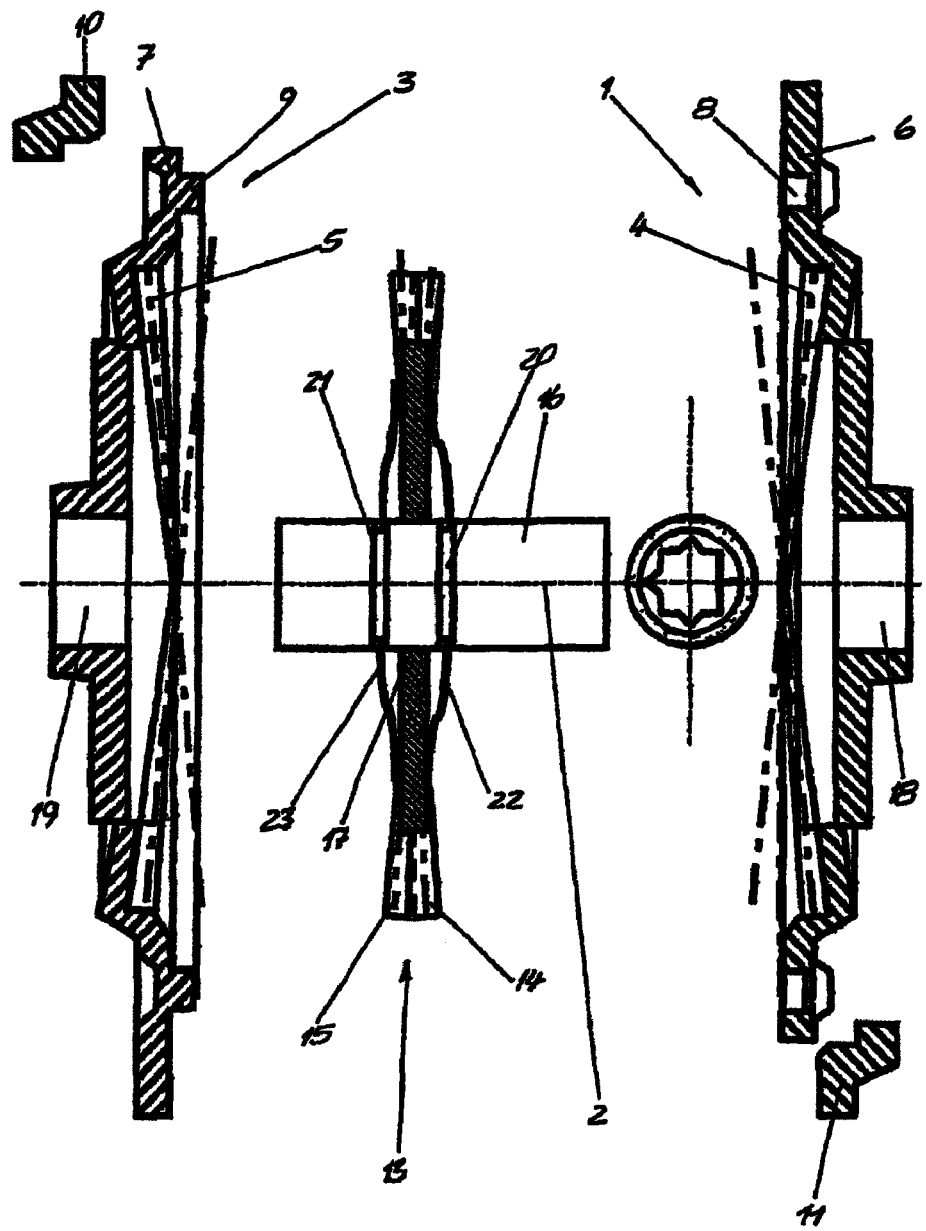
FIG. 3 shows the hinged fitting according to FIG. 1 in an exploded illustration.

The hinged fitting illustrated in the figures has a first gear wheel 1, which is formed integrally with a fixed fitting part, and a pivotable fitting part which can be pivoted about a pivot axis 2 relative to the fixed fitting part and is formed integrally with a second gear wheel 3.

The first gear wheel 1 has an axially oriented toothing 4 and the second gear wheel 3 has a likewise axially oriented toothing 5, the two toothings 4 and 5 lying axially opposite each other and facing each other and preferably being designed as a bevel gear toothing.

The gear wheels 1 and 3 bear against each other by means of their annular regions 6 and 7 which are located radially outside the toothings 4 and 5 and face each other. In this case, an annular groove 8 is formed in the annular region 6 of the first gear wheel 1, which annular groove is open toward the annular region 7 of the second gear wheel 3, is concentric with respect to the pivot axis 2 and in which an axially protruding annular lug 9 of the second gear wheel 3 of corresponding cross section engages.

A securing element 10 which engages around the radially encircling edge of the second gear wheel 3 is fastened to the first gear wheel 1. Diametrically opposite the securing element 10, a corresponding securing element 11 which engages around the radially encircling edge of the first gear wheel 1 is fastened to the second gear wheel 3. The gear wheels 1 and 3 are secured against lifting off axially from each other by the securing elements 10 and 11.

There is an axial distance between the two gear wheels 1 and 3 radially inward from the radially outer region of the toothings 4 and 5, as a result of which a chamber 12 in the manner of a circular disk is formed.

A locking wheel 13 which has a respective axial toothing 14 and 15 on both sides is arranged coaxially with respect to the pivot axis 2 in said chamber 12. The toothings 14 and 15 have the same number of teeth and are designed such that they are offset by half a pitch with respect to each other. They are inclined by a small amount toward their radially outer ends in relation to the axis 8.

In this case, the toothing 14 of the locking wheel 13 lies coaxially opposite the toothing 4 of the first gear wheel 1 and the toothing 15 of the locking wheel 13 lies coaxially opposite the toothing 5 of the second gear wheel 3. The toothings 14 and 15 of the locking wheel 13 are designed in terms of their geometry in such a manner that they can enter the respectively opposite toothings 4 and 5 of a first and second gear wheel 1 and 3.

The toothing 5 of the second gear wheel 3 has a tooth difference of "1" in relation to the axially opposite toothing 15 of the locking wheel 13, while the toothing 4 of the first gear wheel 1 has a tooth difference of "0" in relation to the opposite toothing 14 of the locking wheel 13.

A hub 16 protrudes coaxially with respect to the pivot axis 8 through a coaxial bore 17 of the locking wheel 13 in such a manner that the locking wheel 13 is arranged in a freely rotatable and tiltable manner on the hub 16.

The hub 16 is furthermore guided through bearing bores 18 and 19 of the first gear wheel 1 and of the second gear wheel 3, which bearing bores are coaxial with respect to the pivot axis 2, and can be displaced axially in said bearing bores 18 and 19 between a coupling position and a decoupling position by means of an actuating device (not illustrated).

At a distance on both sides of the locking wheel 13, radially encircling annular grooves 20 are formed in the radially encircling circumferential surface of the hub 16, and respective disk springs 22 and 23 are inserted by means of their through-bore in said annular grooves.

The two disk springs 22 and 23 are in contact by means of their outer, radially encircling region under prestress with the side surfaces of the locking wheel 13.

In the coupling position normally adopted (FIG. 2), the hub 16 can be displaced in the direction of the second gear wheel 3 by the actuating device and, via the disk spring 22, presses the locking wheel 13 by part of its toothing 15 into the toothing 5 of the second gear wheel 3.

Since, in the process, the locking wheel 13 tilts in relation to the pivot axis 2, the toothing 14 of the locking wheel 13, which toothing is diametrically opposite that part of the toothing 15 which comes into engagement, comes into engagement in the toothing 4 of the first gear wheel 1.

As a result, the second gear wheel 3 is locked in the pivoted position it has adopted.

If the hub 16 is displaced in the direction of the first gear wheel 1 by the actuating device, the toothing 14 of the locking wheel 13 is completely entered into the toothing 4 of the first gear wheel by means of the disk spring 23 such that the second gear wheel 3 can be freely pivoted (FIG. 1).

LIST OF DESIGNATIONS

1 First gear wheel
2 Pivot axis
3 Second gear wheel
4 Toothing
5 Toothing
6 Annular region
7 Annular region
8 Annular groove
9 Annular lug
10 Securing element
11 Securing element
12 Chamber
13 Locking wheel
14 Toothing
15 Toothing
16 Hub
17 Coaxial bore
18 Bearing bore
19 Bearing bore
20 Annular groove
21 Annular groove
22 Disk spring
23 Disk spring

What is claimed is:

1. A hinged fitting for a vehicle seat, with a fixed fitting part and a pivotable fitting part which are connected to each other in a manner such that they can pivot about a pivot axis, wherein the pivoting movement of the pivotable fitting part can be infinitely variably blocked by a blocking device comprising:
    a first blocking element which is connected in a rotationally fixed manner to the fixed fitting part, and
    a second blocking element which is connected in a rotationally fixed manner to the pivotable fitting part, wherein the blocking elements which lie opposite each other coaxially with respect to the pivot axis can be coupled to each other in a rotationally fixed manner and can be decoupled from each other,
    wherein the first blocking element comprises a first gear wheel which is coaxial with respect to the pivot axis and has a radially oriented first toothing, and the second blocking element comprises a second gear wheel which is coaxial with respect to the pivot axis and has a radially oriented second toothing, said toothings being arranged at a fixed distance from each other coaxially with respect to the pivot axis, a locking wheel being arranged coaxially between the first and second toothings, said locking wheel having, on both sides, a respective radially encircling, axially oriented toothing with a mutually offset pitch, the geometries of which are designed in such a manner that said toothings can enter the respectively coaxially opposite toothings of the fixed fitting part and the pivotable fitting part, the first toothing of the fixed fitting part having the same number of teeth as the coaxially opposite toothing of the locking wheel, and the second toothing of the movable fitting part having a different number of teeth from the coaxially opposite toothing of the locking wheel, and the locking wheel which can be inclined with respect to the pivot axis being movable axially between the two gear wheels.

2. The hinged fitting as claimed in claim 1, wherein the toothings on both sides of the locking wheel have the same number of teeth and are offset with respect to each other by half a pitch.

3. The hinged fitting as claimed in claim 1, wherein the second toothing of the movable fitting part has a tooth difference of "1" or of ">1" to the coaxially opposite toothing of the locking wheel.

4. The hinged fitting as claimed in claim 1, wherein the locking wheel is mounted by means of a coaxial bore in a freely rotatable and tiltable manner on a hub which is coaxial with respect to the pivot axis.

5. The hinged fitting as claimed in claim 4, wherein the hub is guided through bearing bores of the first gear wheel and/or of the second gear wheel, which bearing bores are coaxial with respect to the pivot axis.

6. The hinged fitting as claimed in claim 5, wherein the hub is mounted in a manner such that it can be displaced axially in the bearing bores between a coupling position and a decoupling position, and the locking wheel is held on both sides between spring elements which are arranged on the hub and subject the locking wheel axially to the action of a force.

7. The hinged fitting as claimed in claim 6, wherein the spring elements are disk springs which are arranged by means of their bores in annular grooves formed in a radially encircling manner on the hub and are in contact by means of their outer, radially encircling region under prestress with side surfaces of the locking wheel.

8. The hinged fitting as claimed in claim 5, wherein the hub can be locked in the coupling position and/or in the decoupling position.

9. The hinged fitting as claimed in claim 1, wherein the toothings of the first gear wheel and/or of the second gear wheel are of inclined design in a manner corresponding to an inclined deflection of the locking wheel with respect to the pivot axis.

10. The hinged fitting as claimed in claim 1, wherein the first gear wheel and the second gear wheel are in contact with each other by means of their mutually facing, axially directed annular regions located radially outside the locking wheel.

11. The hinged fitting as claimed in claim 10, wherein the axially directed annular region of the one gear wheel has a concentrically encircling annular groove which is open toward the other gear wheel and in which one or more axially protruding lugs which have a radial width and are part of the other gear wheel engage.

12. The hinged fitting as claimed in claim 10, wherein the first gear wheel is secured by securing elements against lifting off axially from the second gear wheel.

* * * * *